(12) United States Patent
Cholas et al.

(10) Patent No.: US 11,886,829 B2
(45) Date of Patent: Jan. 30, 2024

(54) CONTENT ACCESS DEVICES THAT USE LOCAL AUDIO TRANSLATION FOR CONTENT PRESENTATION

(71) Applicant: T-Mobile USA, Inc., Bellevue, WA (US)

(72) Inventors: Chris A. Cholas, Denver, CO (US); Stacey Stockburger, Denver, CO (US); Eliza Kelly, Denver, CO (US)

(73) Assignee: T-Mobile USA, Inc., Bellevue, WA (US)

( * ) Notice: Subject to any disclaimer, the term of this patent is extended or adjusted under 35 U.S.C. 154(b) by 692 days.

(21) Appl. No.: 16/876,189

(22) Filed: May 18, 2020

(65) Prior Publication Data

US 2021/0357597 A1    Nov. 18, 2021

(51) Int. Cl.
*G06F 40/58* (2020.01)
*G10L 15/00* (2013.01)
*G10L 15/22* (2006.01)
*H04N 21/234* (2011.01)
*G06F 40/166* (2020.01)

(52) U.S. Cl.
CPC ............ *G06F 40/58* (2020.01); *G06F 40/166* (2020.01); *G10L 15/005* (2013.01); *G10L 15/22* (2013.01); *H04N 21/23406* (2013.01); *G10L 2015/227* (2013.01)

(58) Field of Classification Search
CPC ..... G06F 40/58; G06F 40/166; G10L 15/005; G10L 15/22; G10L 2015/227; G10L 25/57; G10L 13/033; G10L 15/26; H04N 21/23406; H04N 21/234336; H04N 21/2368; H04N 21/8106
USPC ............................................................. 704/2
See application file for complete search history.

(56) References Cited

U.S. PATENT DOCUMENTS

| | | | |
|---|---|---|---|
| 9,374,612 B2 | 6/2016 | Bangalore et al. | |
| 10,067,937 B2 | 9/2018 | Crosley | |
| 10,917,607 B1* | 2/2021 | Cheung | H04N 5/9305 |
| 2005/0075857 A1 | 4/2005 | Elcock et al. | |
| 2014/0142917 A1 | 5/2014 | D'Penha | |
| 2019/0130176 A1 | 5/2019 | Maxwell | |
| 2020/0042601 A1 | 2/2020 | Doggett | |
| 2020/0111474 A1* | 4/2020 | Kumar | G10L 15/19 |
| 2020/0279459 A1* | 9/2020 | Singh | H04W 4/12 |

* cited by examiner

*Primary Examiner* — Thierry L Pham
(74) *Attorney, Agent, or Firm* — Lee & Hayes, P.C.

(57) ABSTRACT

A content access device uses local audio translation for content presentation. The content access device receives video and first audio data associated with a first language. The content access device uses translation software and/or other automated translation services to translate the first audio data to second audio data associated with a second language. The content access device synchronizes the video with the second audio data and outputs the video and the second audio data for presentation. The first audio data may be audio, text, and so on. The second audio data may be output as audio, text, and so on.

20 Claims, 9 Drawing Sheets

CONTENT ACCESS DEVICES THAT USE LOCAL AUDIO TRANSLATION FOR CONTENT PRESENTATION

FIELD

The described embodiments relate generally to audio translation. More particularly, the present embodiments relate to content access devices that use local audio translation for content presentation.

BACKGROUND

Content provider systems typically provide one or more different types of content from one or more content sources to one or more different types of content access devices. For example, cable television content provider systems may broadcast television programs or movies to set top boxes, and may also provide on demand movies or other content upon request. By way of another example, streaming media providers may provide streaming video and/or audio upon request to a variety of different computing devices.

Content provider systems typically provide content that includes speech audio and/or text of a particular language. For example, a television program may be recorded with English speech audio. In some situations, the content provider system may make another language version of the program available, such as where the television program is simulcast in Spanish or French, or where the English speech audio is provided in a primary audio stream but Spanish or French speech audio for the television program is also provided with the television program in a secondary audio stream.

SUMMARY

The present disclosure relates to content access devices that use local audio translation for content presentation. A content access device may receive video and first audio data associated with a first language. The content access device may use translation software and/or other automated translation services to translate the first audio data to second audio data associated with a second language. The content access device may synchronize the video with the second audio data and output the video and the second audio data for presentation.

In various embodiments, a content access device includes a communication unit, a non-transitory storage medium that stores instructions, and a processor. The processor executes the instructions to receive video using the communication unit; buffer the video in the non-transitory storage medium; receive, using the communication unit, first audio of a first language corresponding to the video; convert the first audio to first text in the first language; translate the first text to second text in a second language; generate second audio from the second text; synchronize the second audio with the video; and output the second audio with the video from the buffer.

In some examples, the processor synchronizes the second audio with the video using time stamps associated with the video and the first audio. In a number of examples, the processor synchronizes the second audio with the video by using motion analysis of the video to determine a speaker. In various examples, the processor synchronizes the second audio with the video by using speech analysis of the first audio to distinguish between speakers. In some examples, generation of the second audio replicates an audio voice fingerprint from the first audio. In various examples, the processor translates the first text by transmitting the first text to a translation server using the communication unit. In a number of examples, the processor translates the first text using translation software.

In some embodiments, a content access device includes a communication unit, a non-transitory storage medium that stores instructions, and a processor. The processor executes the instructions to receive video using the communication unit; receive, using the communication unit, first audio data of a first language corresponding to the video; use translation software to translate the first audio data to second audio data of a second language; synchronize the second audio data with the video prior to outputting the video; and output the second audio data with the video.

In various examples, the processor receives the first audio data prior to the video. In some examples, the first audio data is closed captioning data.

In some examples, the processor outputs the second audio data as text on a display. In a number of implementations of such examples, the content access device includes the display. In various implementations of such examples, the display is incorporated into an electronic device and the processor outputs the text on the display by transmitting the text to the electronic device.

In various examples, the processor receives the first audio data and the video from separate sources.

In a number of embodiments, a content access device includes a communication unit, a non-transitory storage medium that stores instructions, and a processor. The processor executes the instructions to receive video using the communication unit; receive, using the communication unit, first audio data of a first language corresponding to the video; translate the first audio data to second audio data of a second language; estimate a time to delay presentation of the video to account for a translation time of the first audio data; delay presentation of the video for the time; and output the video with the second audio data.

In some examples, the processor selects the second language based on received user input. In a number of implementations of such examples, the received user input is stored.

In various examples, the processor selects the second language based on a location of the content access device. In some examples, the processor receives the video and the first audio data in a single stream. In a number of examples, the processor receives the video and the first audio data as separate streams.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
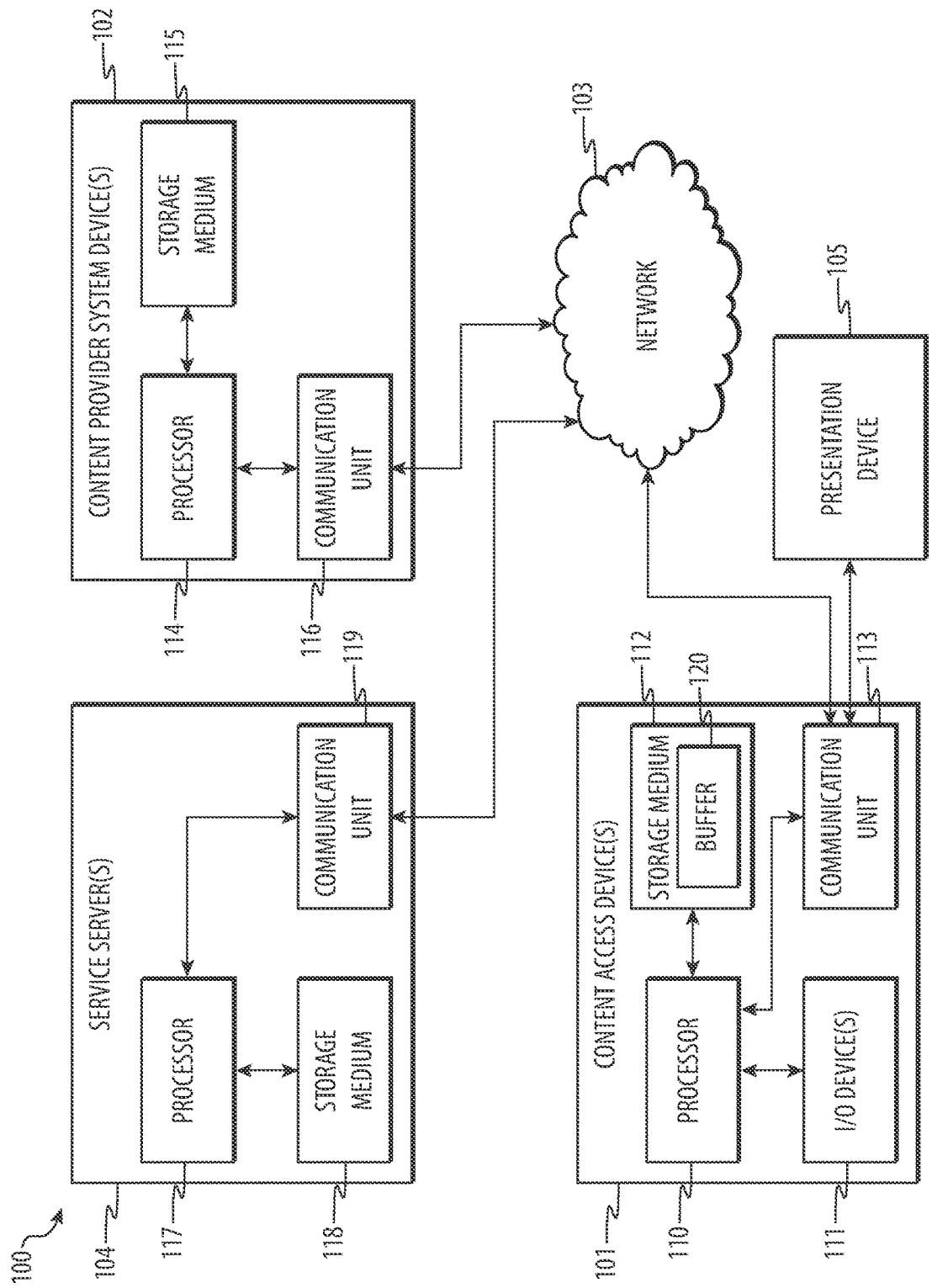
FIG. 1 depicts an example system for local audio translation for content presentation.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The description that follows includes sample systems, methods, apparatuses, and computer program products that embody various elements of the present disclosure. However, it should be understood that the described disclosure may be practiced in a variety of forms in addition to those described herein.

Much of the content provided by content provider systems may only be provided with speech audio and/or text (such as closed captioning) in the language or languages in which the content was recorded. This may limit the audience for the content. The language chosen may correspond to the primary language associated with the market served by the content provider system. In some situations, multi-language support may be provided. However, this is typically restricted to one or two languages that are the next most common associated with the market, such as in markets where English is the most common language followed by Spanish and/or French.

Content providers may wish to support a broader variety of languages. Not only might this enable content providers to comply with the suggestions and/or requirements of regulatory bodies, such as the Federal Communications Commission, the content provider might have a larger possible audience. The world does not communicate in just one language, or even a handful. There are approximately 6500 languages in the world. While not all may be commonly used, and many regions may be heavily associated with one or two primary languages, there are an increasing number of regions that are associated with an increasingly diverse set of languages. Primary support in English with secondary support in Spanish and/or French may fall short in regions that are associated with Russian, Argentinian, Chinese, Japanese, Greek, and so on.

Regardless, multi-language support comes at a cost. It may be expensive to record multiple language tracks for content. Further, as the number of supported languages increases, the hardware and/or software resources used to support those languages increases. For example, storage may be used to store data for those languages, network bandwidth may be used to transmit the data for those languages, and so on. Such multi-language support may increase the amount of storage and/or storage devices used by the content provider system, consume more network bandwidth, increase the cost of the system, slow system operation, introduce transmission delays, and so on.

The following disclosure relates to content access devices that use local audio translation for content presentation. A content access device may receive video and first audio data associated with a first language. The content access device may use translation software and/or other automated translation services to translate the first audio data to second audio data associated with a second language. The content access device may synchronize the video with the second audio data and output the video and the second audio data for presentation.

By way of illustration, rather than expending resources to create and translate multiple languages for content, one language audio and/or text corresponding to video (such as closed captioning data) may be transmitted to a content access device. That audio and/or text may be used by local content access device hardware (and/or a cloud based or similar service for the content access device) to translate the audio and/or text (such as by using translation software) and generate audio and/or text in the target language (such as using text-to-speech software). The audio and/or text in the target language may then be synchronized with the video for output. The local content access device hardware may buffer the video and/or audio and/or text to delay output until the synchronized video and/or audio and/or text can be rendered together, avoiding lag. Alternatively, the translated audio and/or text may be synchronized with the video for output as closed captioning text in the target language. This may conserve transmission bandwidth, reduce possible transmission delays, reduce network loads, conserve storage, eliminate redundant storage and/or transmission hardware, improve system efficiency, increase system responsiveness, decrease server loads, enable support for more languages than were previously possible, and so on. In some implementations, synchronization may be performed using time stamps in the video and the audio and/or text, by motion analysis to determine when people (and/or particular people) are speaking, and so on. In various implementations, the target language may be determined based on user preferences, estimated based on positional awareness, and so on.

In various examples, the content access device may buffer the video during translation. This may prevent and/or reduce lag between the video and the second audio data. For example, the content access device may buffer the video for a fixed time period before output (such as thirty seconds), may buffer the video until the translation is complete, may estimate a time period for translation and buffer the video for the estimated time period, and so on.

In some examples, the content access device may receive the first audio data along with the video. In other examples, the content access device may receive the first audio data separately from the video. By way of illustration, the content access device may receive the first audio data in advance of the video in order to begin translation before the video is received. The first audio data and the video may be received from the same or different sources.

In a number of examples, the first audio data may be audio associated with a first language, such as speech. In such an example, the first audio may be converted to first text using speech recognition software and/or other automated speech recognition services. The first text may then be translated to second text associated with a second language. The second text may then be used for synchronization and/or output (such as closed captioning), and/or may be converted to second audio that may then be used for synchronization and/or output. By way of illustration, text-to-speech software and/or other automated text-to-speech services may be used to convert the second text to the second audio. In some implementations, neural text-to-speech software or the like may be used to generate the second audio with natural speech inflections. In various implementations, the text-to-speech software may be configured based on one or more audio voice fingerprints and/or other voice characteristics of the first audio so that the second audio more closely resembles the original speaker. By way of illustration, the text-to-speech software may be configured to replicate the audio voice fingerprint of the original speaker.

In other examples, the first audio may be translated directly to second audio. For example, the translation software and/or other automated translation service may perform speech translation, which may translate speech of the first language directly to speech of the second language without the intermediate step of converting to text and translating the converted text.

In other examples, the first audio data may be first text associated with a first language, such as closed captioning data. The first text may be translated to second text associated with a second language, which may be used for synchronization and/or output (such as closed captioning), and/or may be converted to second audio that may then be used for synchronization and/or output.

In various examples, the content access device may synchronize the video and the second audio data using time stamps in and/or associated with the video, the first audio data, and/or the second audio data. In other examples, the content access device may synchronize the video and the second audio data by performing motion analysis on the video to determine when people (and/or particular people) are speaking. In still other examples, the content access device may synchronize the video and the second audio data by analyzing the video and performing speech analysis on the first audio data to determine when a particular person with a particular audio voice fingerprint and/or other voice characteristics is speaking and the speech that corresponds to that particular person.

In a number of examples, the language into which the content access device translates may be determined by a number of different factors. In some implementations, the content access device may be configured to translate into the language. In other implementations, the language may be configured based on one or more user preferences. In still other implementations, the content access device may select the language based on positional awareness (such as a global positioning system and/or other location data that may be correlated to a language associated with a current position in order to determine a "most likely" language into which to translate).

These and other embodiments are discussed below with reference to FIGS. 1-12. However, those skilled in the art will readily appreciate that the detailed description given herein with respect to these Figures is for explanatory purposes only and should not be construed as limiting.

FIG. 1 depicts an example system 100 for local audio translation for content presentation. The system 100 may include one or more content access devices 101 that are operable to receive content from one or more content provider system devices 102 via one or more communication networks 103 and perform local audio translation for the content. The content access device 101 may be operable to output the content for presentation, whether via an output device included in the content access device 101 and/or via an associated presentation device 105 (such as an associated display, television, speaker, computing device, mobile computing device, and so on). The content access device 101 may be further operable to communicate with one or more service servers 104 via the network 103, such as to perform various functions associated with local audio translation.

The content access device 101 may receive video and first audio data associated with a first language. The content access device 101 may receive the video and the first audio data from the content provider system device 102 and/or another content source. The content access device 101 may use translation software and/or other automated translation services to translate the first audio data to second audio data associated with a second language. In some examples, this may involve first decrypting the first audio data. The content access device 101 may synchronize the video with the second audio data and output the video and the second audio data for presentation, such as via an input and/or output device 111 of the content access device 101, the associated presentation device 105, and so on.

By way of illustration, rather than expending resources to create and translate multiple languages for content, one language audio and/or text (such as closed captioning data) corresponding to video may be transmitted to the content access device 101. The content access device 101 may use the audio and/or text (and/or a cloud-based or similar service for content access device 101) to translate the audio and/or text (such as by using translation software) and generate audio and/or text in the target language (such as using text-to-speech software). The content access device 101 may then synchronize the audio and/or text in the target language with the video for output. The content access device 101 may buffer the video and/or audio and/or text to delay output until the synchronized video and/or audio and/or text can be rendered together, avoiding lag. Alternatively, content access device 101 may synchronize the translated audio and/or text with the video for output as closed captioning text in the target language. This may conserve transmission bandwidth of the network 103, reduce possible transmission delays, reduce network 103 loads, conserve storage, eliminate redundant storage and/or transmission hardware, improve system 100 efficiency, increase system 100 responsiveness, decrease loads of the content provider system device 102, enable support for more languages than were previously possible, and so on. In some implementations, the content access device 101 may perform synchronization using time stamps in the video and the audio and/or text, by motion analysis (such as on one or more frames of the video) to determine when people (and/or particular people) are speaking, by a combination of these techniques (such as where motion analytics of the video are used to detect lip movement and ensure that synchronization performed according to time stamps is accurate), and so on. In various implementations, the content access device 101 may determine the target language based on user preferences, estimated based on positional awareness, and so on.

In various examples, the content access device 101 may buffer the video during translation. This may prevent and/or reduce lag between the video and the second audio data. For example, the content access device 101 may buffer the video for a fixed time period before output (such as thirty seconds), may buffer the video until the translation is complete, may estimate a time period for translation and buffer the video for the estimated time period, and so on.

In some examples, the content access device 101 may receive the first audio data along with the video. In other examples, the content access device 101 may receive the first audio data separately from the video. By way of illustration, the content access device 101 may receive the first audio data in advance of the video in order to begin translation before the video is received. The content access device 101 may receive the first audio data and the video from the same or different sources, such as from the content provider system device 102 and/or one or more other content sources.

In a number of examples, the first audio data may be audio associated with a first language, such as speech. In such an example, the first audio data may be converted to first text using speech recognition software and/or other automated speech recognition services, such as by the content access device 101 and/or the service server 104 at the request of the content access device 101. The first text may then be translated to second text associated with a second language. The second text may then be used for synchronization and/or output (such as closed captioning), and/or may be converted to second audio that may then be used for synchronization and/or output. By way of illustration, text-to-speech software and/or other automated text-to-speech services may be used to convert the second text to the second audio. In some implementations, neural text-to-speech software or the like may be used to generate the second audio with natural speech inflections. In various implementations, the text-to-speech software may be configured based on one or more audio voice fingerprints and/or other voice characteristics of the first audio so that the second audio more closely resembles the original speaker. By way of illustration, the text-to-speech software may be configured to replicate the audio voice fingerprint of the original speaker.

In other examples, the first audio may be translated directly to second audio. For example, the translation software and/or other automated translation service (implemented by the content access device 101 and/or the service server 104) may perform speech translation, which may translate speech of the first language directly to speech of the second language without the intermediate step of converting to text and translating the converted text.

In other examples, the first audio data may be first text associated with a first language, such as closed captioning data. The first text may be translated to second text associated with a second language, which may be used for synchronization and/or output (such as closed captioning), and/or may be converted to second audio that may then be used for synchronization and/or output. Text may have the additional advantage of being able to be transmitted ahead of video, possibly reducing perceptible lags that might otherwise occur when the text is translated and/or converted to audio. Additionally, transmitting text may use less bandwidth than audio, which may further reduce transmission costs, bandwidth consumption, lag, and so on.

In various examples, the content access device 101 may synchronize the video and the second audio data using time stamps in and/or associated with the video, the first audio data, and/or the second audio data. In other examples, the content access device 101 may synchronize the video and the second audio data by performing motion analysis on the video to determine when people (and/or particular people) are speaking. In still other examples, the content access device 101 may synchronize the video and the second audio data by analyzing the video and performing speech analysis on the first audio data to determine when a particular person with a particular audio voice fingerprint and/or other voice characteristics is speaking and the speech that corresponds to that particular person.

In a number of examples, the language into which the content access device 101 translates may be determined by a number of different factors. In some implementations, the content access device 101 may be configured to translate into the language. In other implementations, the language may be configured based on one or more user preferences. The content access device 101 may store the user preferences in the storage medium 112, access preferences stored by the content provider system device 102, and so on. In still other implementations, the content access device 101 may select the language based on positional awareness (such as a global positioning system and/or other location data from a location component of the content access device 101 and/or another device that may be correlated to a language associated with a current position).

In various implementations, the content access device 101 may receive video using the communication unit 113; buffer the video in the buffer 120; receive, using the communication unit 113, first audio of a first language corresponding to the video; convert the first audio to first text in the first language; translate the first text to second text in a second language; generate second audio from the second text; synchronize the second audio with the video; and output the second audio with the video from the buffer 120.

In some examples, the content access device 101 may synchronize the second audio with the video using time stamps associated with the video and the first audio. In other examples, the content access device 101 may synchronize the second audio with the video by using motion analysis of the video to determine a speaker. In still other examples, the content access device 101 may synchronize the second audio with the video by using speech analysis of the first audio to distinguish between speakers.

In a number of examples, generation of the second audio replicates an audio voice fingerprint from the first audio. In some examples, the content access device 101 may use the translation software by transmitting the first text to a translation server using the communication unit. In other examples, the content access device 101 may execute the translation software.

In some implementations, the content access device 101 may receive video using the communication unit 113; receive, using the communication unit 113, first audio data of a first language corresponding to the video; use translation software to translate the first audio data to second audio data of a second language; synchronize the second audio data with the video prior to outputting the video; and output the second audio data with the video.

In various examples, the content access device 101 may receive the first audio data prior to the video. In a number of examples, the first audio data may be closed captioning data.

In some examples, the content access device 101 may output the second audio data as text on a display. In various embodiments of such examples, the content access device 101 may include the display. In other embodiments of such examples, the display may be incorporated into an electronic device and the content access device 101 may output the text on the display by transmitting the text to the electronic device.

In various examples, the content access device 101 may receive the first audio data and the video from separate sources.

In a number of implementations, the content access device 101 may receive video using the communication unit 113; receive, using the communication unit 113, first audio data of a first language corresponding to the video; translate the first audio data to second audio data of a second language; estimate a time to delay presentation of the video to account for a translation time of the first audio data; delay presentation of the video for the time; and output the video with the second audio data.

In various examples, the content access device 101 may select the second language based on received user input. In some implementations of such examples, the received user input may be stored.

In a number of examples, the content access device 101 may select the second language based on a location of the content access device. In various examples, the content access device 101 may receive the video and the first audio data in a single stream. In other examples, the content access device 101 may receive the video and the first audio data as separate streams.

The content access device 101 may be any kind of electronic device. Examples of such devices include, but are not limited to, one or more desktop computing devices, laptop computing devices, server computing devices, mobile computing devices, tablet computing devices, set top boxes, digital video recorders, televisions, displays, wearable devices, smart phones, digital media players, and so on. The content access device 101 may include one or more processors 110 and/or other processing units and/or controllers, one or more non-transitory storage media 112 (which may take the form of, but is not limited to, a magnetic storage medium; optical storage medium; magneto-optical storage medium; read only memory; random access memory; erasable programmable memory; flash memory; and so on), one or more communication units 113, one or more input and/or output devices 111 (such as one or more displays, speakers, printers, remote control device receivers, buttons, keyboards, track pads, force sensors, capacitive sensors, touch screens, computer mice, and so on), and/or other components. The processor 110 may execute instructions stored in the non-transitory storage medium 112 to perform various functions. Such functions may include receiving user input via the input and/or output device 111, requesting content from the content provider system device 102 using the communication unit 113, receiving content from the content provider system device 102 and/or other content sources using the communication unit 113, performing local audio translation (such as speech-to-text functions, text-to-speech functions, neural text-to-speech functions, text translation functions, speech translation functions, synchronization functions, video motion analysis, audio analysis, and so on), requesting and/or receiving services from the service server 104 via the communication unit 113 as part of performing local audio translation (such as speech-to-text functions, text-to-speech functions, neural text-to-speech functions, text translation functions, speech translation functions, synchronization functions, video motion analysis, audio analysis, and so on), outputting content for presentation via the input and/or output device 111 and/or the presentation device 105, buffering video and/or other content in a buffer 120 defined in the storage medium 112 and/or other buffer, and so on.

Similarly, the content provider system device 102 may be any kind of electronic device. The content provider system device 102 may include one or more processors 114, non-transitory storage media 115, communication units 116, and/or other components. The processor 114 may execute instructions stored in the non-transitory storage medium 115 to perform various functions. Such functions may include receiving requests for content, providing content, communicating with the content access device 101 using the communication unit 116, and so on.

Likewise, the service server 104 may be any kind of electronic device and/or devices configured in a cloud computing configuration and/or other arrangement. The service server 104 may include one or more processors 117, non-transitory storage media 118, communication units 119, and/or other components. The processor 117 may execute instructions stored in the non-transitory storage medium 118 to perform various functions. Such functions may include receiving requests for local audio translation functions (speech-to-text functions, text-to-speech functions, neural text-to-speech functions, text translation functions, speech translation functions, synchronization functions, video motion analysis, audio analysis, and so on), providing local audio translation functions (speech-to-text functions, text-to-speech functions, neural text-to-speech functions, text translation functions, speech translation functions, synchronization functions, video motion analysis, audio analysis, and so on), communicating with the content access device 101 using the communication unit 119, and so on.

Although the system 100 is illustrated and described as including particular components arranged in a particular configuration, it is understood that this is an example. In a number of implementations, various configurations of various components may be used without departing from the scope of the present disclosure.

For example, the system 100 is illustrated and described as including the service server 104. However, it is understood that this is an example. In various implementations, the system 100 may use the content access device 101 and/or another device to perform the functions attributed above to the service server 104. In such an implementation, the service server 104 may be omitted. Various configurations are possible and contemplated without departing from the scope of the present disclosure.

By way of another example, the system 100 is illustrated and described as including the presentation device 105. However, it is understood that this is an example. In various implementations, the content access device 101 and/or another device may present content. In such an implementation, the presentation device 105 may be omitted. Various configurations are possible and contemplated without departing from the scope of the present disclosure.

By way of yet another example, the system 100 is illustrated and described as synchronizing video with translated audio data. However, it is understood that this is an example. In various implementations, lag between unsynchronized video and translated audio data may be acceptable without synchronization, quicker presentation may outweigh perceptible lag between unsynchronized video and translated audio data, and so on. In such implementations, synchronization may be omitted. Various configurations are possible and contemplated without departing from the scope of the present disclosure.

In yet another example, the system 100 is illustrated and described as either the content access device 101 or the service server 104 performing one or more local audio translation functions (speech-to-text functions, text-to-speech functions, neural text-to-speech functions, text translation functions, speech translation functions, synchronization functions, video motion analysis, audio analysis, and so on). However, it is understood that this is an example. In various implementations, a hybrid approach may be used, such as where some functions are performed by the content access device 101 while others are performed by the service server 104, the content access device 101 takes over some of these functions allocated to the service server 104 if response latency increases, the service server 104 is allocated some of these functions originally allocated to the content access device 101 when the content access device 101 becomes overloaded, the content access device 101 performs translation of a first set of commonly used words and/or phrases and the service server 104 performs translation of a second set of less commonly used words and/or phrases, the content access device 101 performs translation when translation is to a commonly used language and the service server 104 performs translation when translation is to one of a less commonly used language, and so on. Further, the content access device 101 may be operable to communicate with one or more devices on a local area network and/or other devices that are otherwise "local" to the content access device 101, as opposed to the service server 104 being "remote" to the content access device 101, and the content access device 101 may use such a local device or devices to perform various of the local audio translation functions allocated to the content access device 101 as opposed to requesting services accordingly from the service server 104. Various configurations are possible and contemplated without departing from the scope of the present disclosure.

Additionally, the above techniques are illustrated and described with respect to video associated with audio or audio data. However, it is understood that this is an example. In various implementations, the content access device 101 may extract text associated with a graphic interface and/or other graphic, translate the extracted text, and generate a modified graphic interface and/or other graphic that includes the translated text. Various configurations are possible and contemplated without departing from the scope of the present disclosure.

Figure 2:
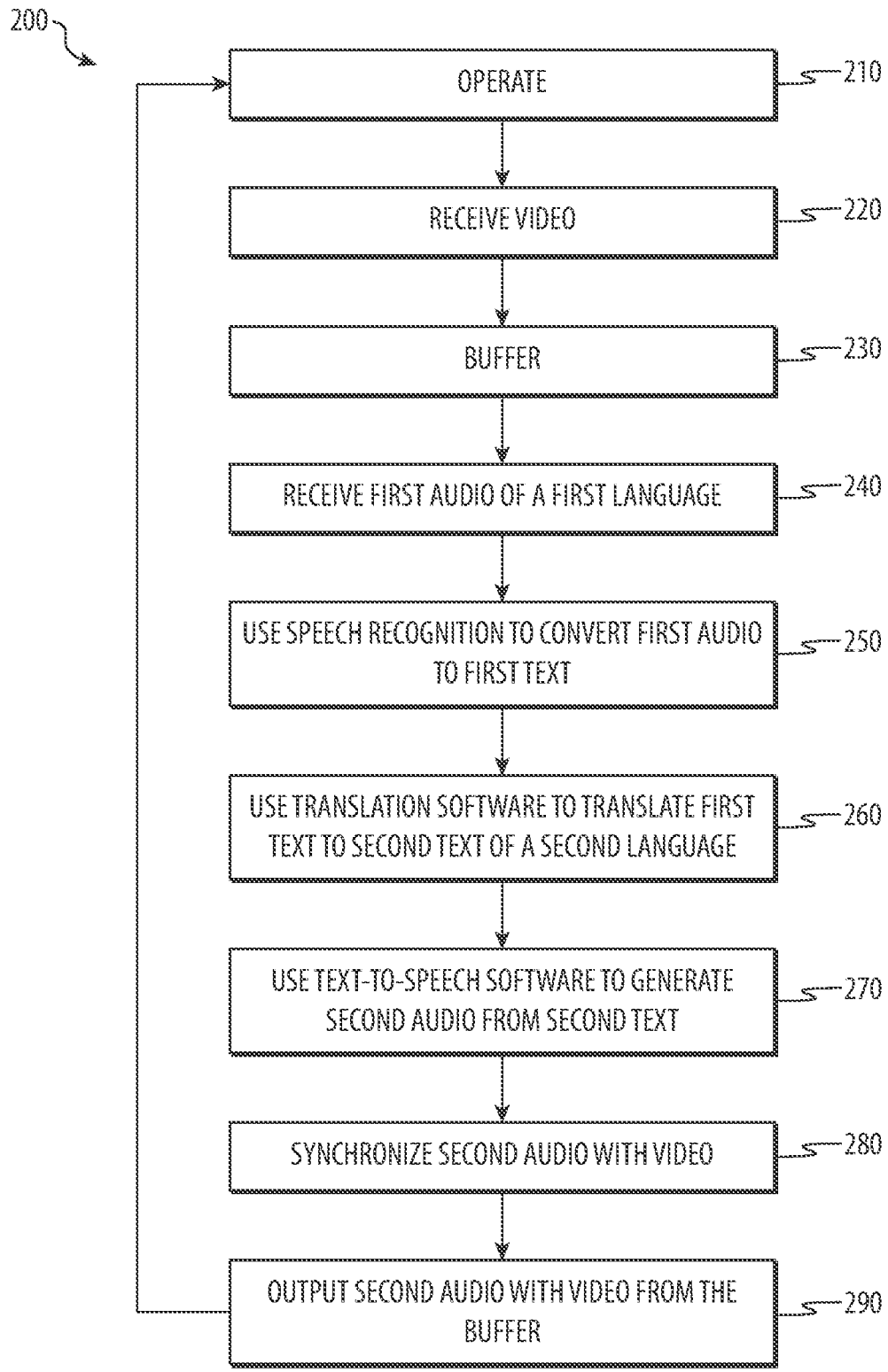
FIG. 2 depicts a flow chart illustrating a first example method for local audio translation for content presentation. This method may be performed by the system of FIG. 1.

FIG. 2 depicts a flow chart illustrating a first example method 200 for local audio translation for content presentation. This method 200 may be performed by the system 100 of FIG. 1.

At operation 210, an electronic device (such as the content access device 101) may operate. At operation 220, the electronic device may receive video. The flow may proceed to operation 230 where the electronic device may buffer the video. The flow may then proceed to operation 240 where the electronic device may receive first audio of a first language.

At operation 250, the electronic device may use speech recognition software to convert the first audio to first text in the first language. At operation 260, the electronic device may use translation software to translate the first text to second text of a second language. At operation 270, the electronic device may use text-to-speech software to generate second audio from the second text. In some implementations, the text-to-speech software may be neural text-to-speech software that is configured to generate speech from text with natural inflections. In various implementations, the text-to-speech software may be configured to replicate an audio voice fingerprint from the first audio in order to make the generated audio sound more like the second audio was spoken by the same speaker as the first audio.

The flow may then proceed to operation 280 where the electronic device may synchronize the second audio with the video. The electronic device may synchronize the second audio data and the video using time stamps in and/or associated with the video, the first audio, and/or the second audio; by performing motion analysis on the video to determine when people (and/or particular people) are speaking; by analyzing the video and performing speech analysis on the first audio to determine when a particular person with a particular audio voice fingerprint and/or other voice characteristics is speaking and the speech that corresponds to that particular person; and so on.

At operation 290, the electronic device may output the second audio with the video from the buffer. The electronic device may output the second audio with the video for presentation, such as for rendering by the electronic device and/or an associated presentation device.

The flow may then return to operation 210 where the electronic device may continue to operate.

In various examples, this example method 200 may be implemented as a group of interrelated software modules or components that perform various functions discussed herein. These software modules or components may be executed within a cloud network and/or by one or more computing devices, such as the content access device 101 of FIG. 1.

Although the example method 200 is illustrated and described as including particular operations performed in a particular order, it is understood that this is an example. In various implementations, various orders of the same, similar, and/or different operations may be performed without departing from the scope of the present disclosure.

For example, the method 200 is illustrated and described as the electronic device separately receiving the video and then the first audio. However, it is understood that this is an example. In other implementations, the electronic device may receive the video after the first audio, together with the first audio, and so on. Various configurations are possible and contemplated without departing from the scope of the present disclosure.

By way of another example, the method 200 is illustrated and described as converting the first audio to text, translating the first text to second text, and generating second audio from the second text. However, it is understood that this is an example. In other implementations, the first text may be received instead of the first audio, the second text may be output with the video instead of the second audio, the first audio may be directly translated to the second audio without any text conversion operations, and so on. Various configurations are possible and contemplated without departing from the scope of the present disclosure.

Figure 3:
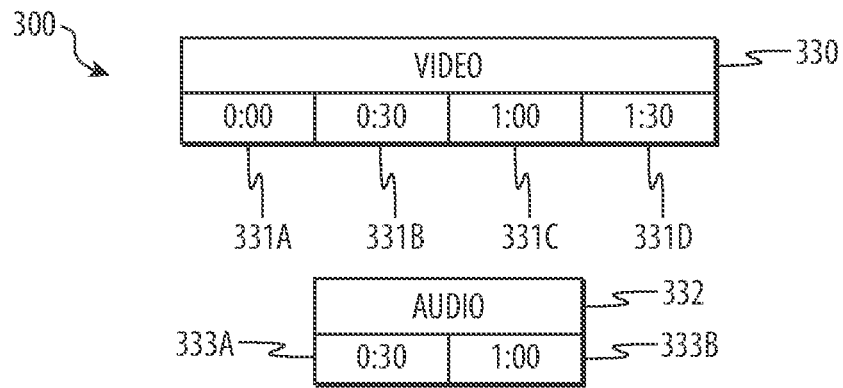
FIG. 3 depicts a first example of video synchronized with translated audio data.

FIG. 3 depicts a first example 300 of video 330 synchronized with translated audio 332 and/or audio data. In this example, the video 330 may be associated with time stamps 331A-331D and the translated audio 332 and/or audio data may be associated with time stamps 333A-333B. An electronic device may synchronize the translated audio 332 and/or audio data and the video 330 by analyzing and/or matching up the time stamps 331A-331D and the time stamps 333A-333B.

Figure 4:
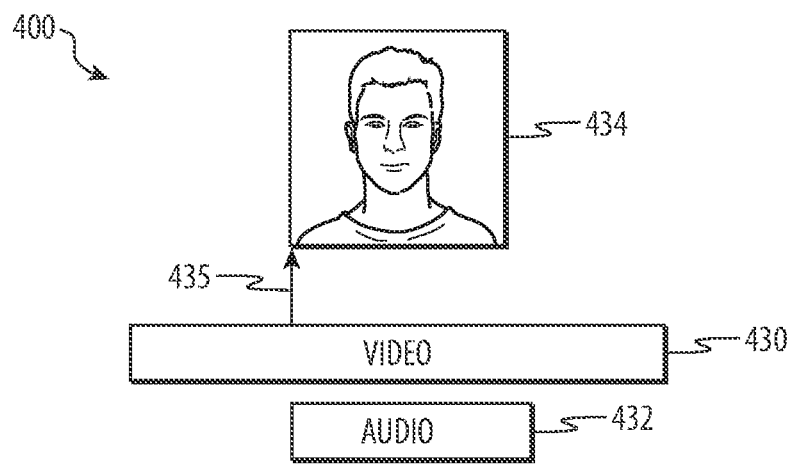
FIG. 4 depicts a second example of video synchronized with translated audio data.

FIG. 4 depicts a second example 400 of video 430 synchronized with translated audio 432 and/or audio data. In this example, the translated audio 432 may correspond to speech by a particular person 434 speaking at a portion 435 in the video 430. An electronic device may synchronize the translated audio 432 and/or audio data and the video 430 by performing motion analysis on the video to determine the portion 435 in the video 430 where the particular person 434 is speaking. Further, although FIG. 4 illustrates one track of translated audio 432 and/or audio data and one particular speaker, it is understood that this is an example. In some implementations, multiple tracks of translated audio and/or audio data may be synchronized to multiple speakers identified in the video 430. For example, separate of translated audio and/or audio data may be synchronized for a young woman speaker, an older woman speaker, a young man speaker, an old man speaker, and/or any other combination of speakers.

Figure 5:
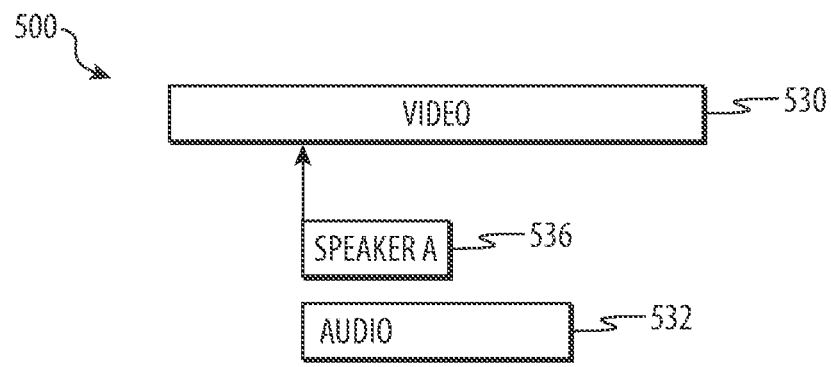
FIG. 5 depicts a third example of video synchronized with translated audio data.

FIG. 5 depicts a third example 500 of video 530 synchronized with translated audio 532 and/or audio data. In this example, the translated audio 532 may correspond to speech by a particular person speaking at a portion 536 in the video 530. An electronic device may synchronize the translated audio 532 and/or audio data and the video 530 by speech analysis on the first audio to determine the portion 536 in the video 530 when the particular person with a particular audio voice fingerprint and/or other voice characteristics is speaking and that the speech corresponds to the translated audio 532. Further, although FIG. 5 illustrates one track of translated audio 532 and/or audio data and one particular speaker, it is understood that this is an example. In some implementations, multiple tracks of translated audio and/or audio data may be synchronized to multiple speakers identified in the video 530. For example, separate of translated audio and/or audio data may be synchronized for a young woman speaker, an older woman speaker, a young man speaker, an old man speaker, and/or any other combination of speakers.

Figure 6:
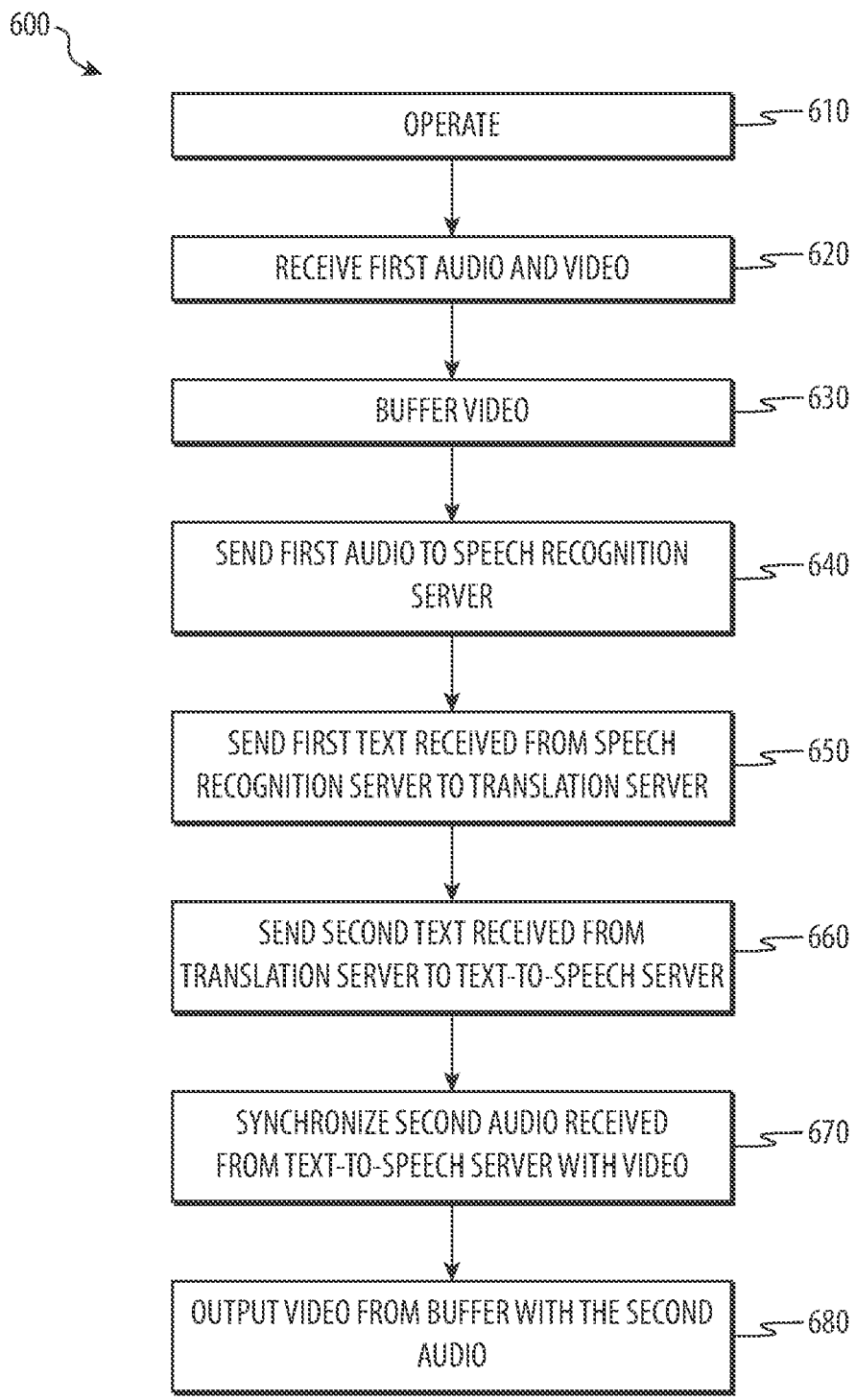
FIG. 6 depicts a flow chart illustrating a second example method for local audio translation for content presentation. This method may be performed by the system of FIG. 1.

FIG. 6 depicts a flow chart illustrating a second example method 600 for local audio translation for content presentation. This method 600 may be performed by the system 100 of FIG. 1.

At operation 610, an electronic device (such as the content access device 101) may operate. At operation 620, the electronic device may receive first audio and video. The first audio may be of a first language. The flow may proceed to operation 630 where the electronic device may buffer the first audio and the video.

At operation 640, the electronic device may send the first audio to a speech recognition server, such as the service server 104 of FIG. 1. The electronic device may receive first text in response from the speech recognition server.

At operation 650, the electronic device may send the first text received from the speech recognition server to a translation server, such as the service server 104 of FIG. 1. The electronic device may receive second text in response from the translation server. The second text may be of a second language. In some examples, the electronic device may specify the second language to the translation server. In other examples, the translation server may be configured to translate to the second language without any specification and/or absent any specification from the electronic device.

At operation 660, the electronic device may send the second text received from the translation server to a text-to-speech server, such as the service server 104 of FIG. 1. The electronic device may receive second audio in response from the text-to-speech server.

At operation 670, the electronic device may synchronize the second audio received from the text-to-speech server with the video. At operation 680, the electronic device may output the video from the buffer with the second audio. The electronic device may output the video from the buffer with the second audio in accordance with the determined synchronization.

In various examples, this example method 600 may be implemented as a group of interrelated software modules or components that perform various functions discussed herein. These software modules or components may be executed within a cloud network and/or by one or more computing devices, such as the content access device 101 of FIG. 1.

Although the example method 600 is illustrated and described as including particular operations performed in a particular order, it is understood that this is an example. In various implementations, various orders of the same, similar, and/or different operations may be performed without departing from the scope of the present disclosure.

For example, the method 600 is illustrated and described as communicating with multiple servers to convert the first audio to first text in the first language, translate the first text to second text, and generate second audio from the second text. However, it is understood that this is an example. In some implementations, the electronic device may communicate with fewer servers that perform the above operations and/or fewer operations. By way of illustration, the electronic device may transmit the first audio to a server that converts the first audio to first text, translates the first text to second text, generates second audio from the second text, and returns the second audio to the electronic device. Alternatively, the server may receive the first audio, translate the first audio directly to the second audio, and return the second audio to the electronic device. Various configurations are possible and contemplated without departing from the scope of the present disclosure.

Figure 7:
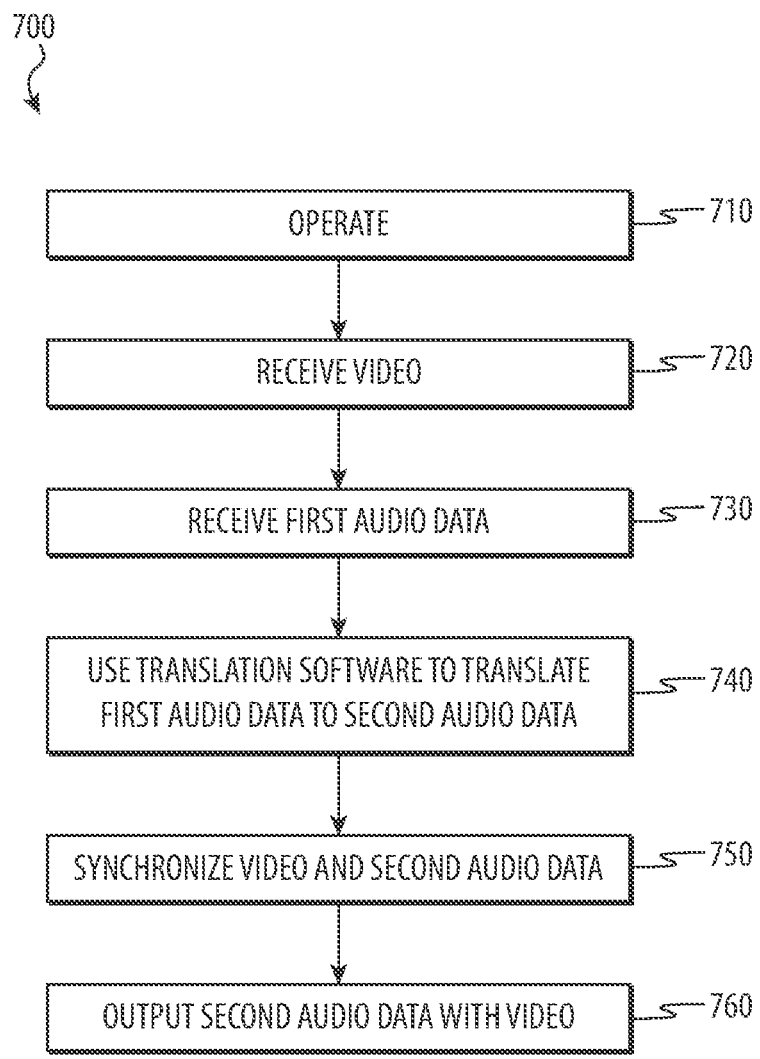
FIG. 7 depicts a flow chart illustrating a third example method for local audio translation for content presentation. This method may be performed by the system of FIG. 1.

FIG. 7 depicts a flow chart illustrating a third example method 700 for local audio translation for content presentation. This method 700 may be performed by the system 100 of FIG. 1.

At operation 710, an electronic device (such as the content access device 101) may operate. At operation 720, the electronic device may receive video. At operation 730, the electronic device may receive first audio data associated with the video. In some examples, the first audio data may be audio. In other examples, the first audio data may be text, such as closed captioning.

At operation 740, the electronic device may use translation software to translate the first audio data to second audio data. In some examples, the second audio data may be audio. In other examples, the second audio data may be text, such as closed captioning.

At operation 750, the electronic device may synchronize the video and the second audio data. The flow may then proceed to operation 760 where the electronic device may output the second audio data with the video.

In various examples, this example method 700 may be implemented as a group of interrelated software modules or components that perform various functions discussed herein. These software modules or components may be executed within a cloud network and/or by one or more computing devices, such as the content access device 101 of FIG. 1.

Although the example method 700 is illustrated and described as including particular operations performed in a particular order, it is understood that this is an example. In various implementations, various orders of the same, similar, and/or different operations may be performed without departing from the scope of the present disclosure.

For example, operation 760 is illustrated and described as outputting the second audio data with the video after synchronization. However, it is understood that this is an example. In some implementations, the video, the first audio data, and/or the second audio data may be stored for subsequent presentation, such as using a digital video recorder. In such an implementation, one or more of the operations of the method 700 may be performed during storage and the operation 760 may be omitted until the stored video, the first audio data, and/or the second audio data is output for presentation from storage.

Figure 8:
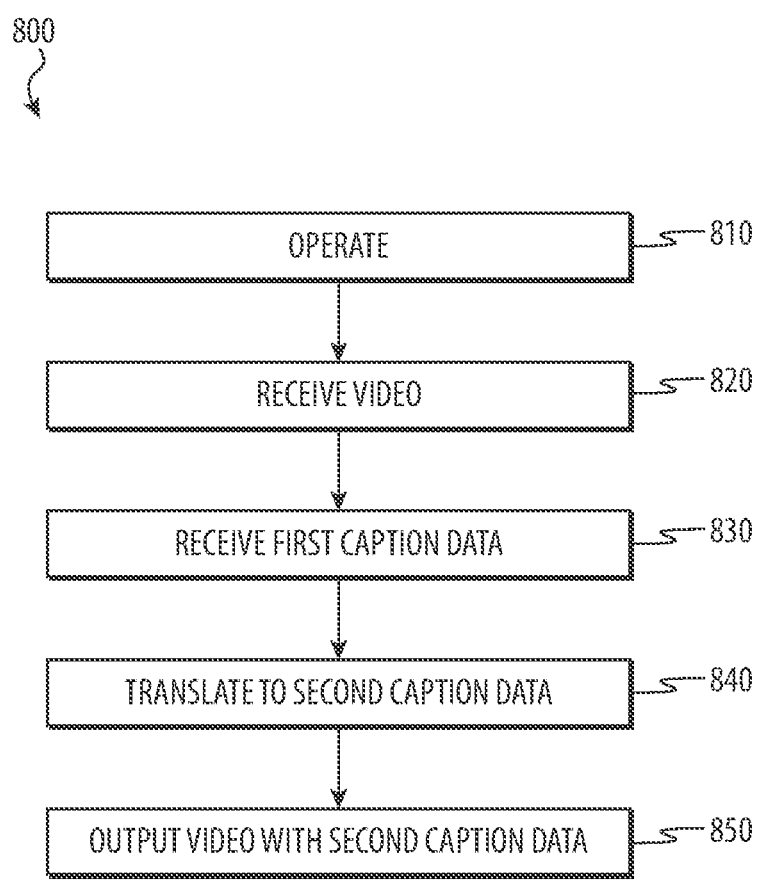
FIG. 8 depicts a flow chart illustrating a fourth example method for local audio translation for content presentation. This method may be performed by the system of FIG. 1.

FIG. 8 depicts a flow chart illustrating a fourth example method 800 for local audio translation for content presentation. This method 800 may be performed by the system 100 of FIG. 1.

At operation 810, an electronic device (such as the content access device 101) may operate. At operation 820, the electronic device may receive video. At operation 830, the electronic device may receive first caption data of a first language.

The flow may proceed to operation 840 where the electronic device translates the first caption data to second caption data of a second language. The electronic device may translate the first caption data to the second caption data by executing translation software, by communicating with a translation server, and so on. The flow may then proceed to operation 850 where the electronic device may output the video with the second caption data.

In various examples, this example method 800 may be implemented as a group of interrelated software modules or components that perform various functions discussed herein. These software modules or components may be executed within a cloud network and/or by one or more computing devices, such as the content access device 101 of FIG. 1.

Although the example method 800 is illustrated and described as including particular operations performed in a particular order, it is understood that this is an example. In various implementations, various orders of the same, similar, and/or different operations may be performed without departing from the scope of the present disclosure.

For example, the method 800 is illustrated and described as the electronic device receiving the video before receiving the first caption data. However, it is understood that these are examples. In various implementations, these operations may be performed in a variety of different orders, simultaneously and/or concurrently, substantially simultaneously and/or concurrently, and so on. Various configurations are possible and contemplated without departing from the scope of the present disclosure.

Figure 9:
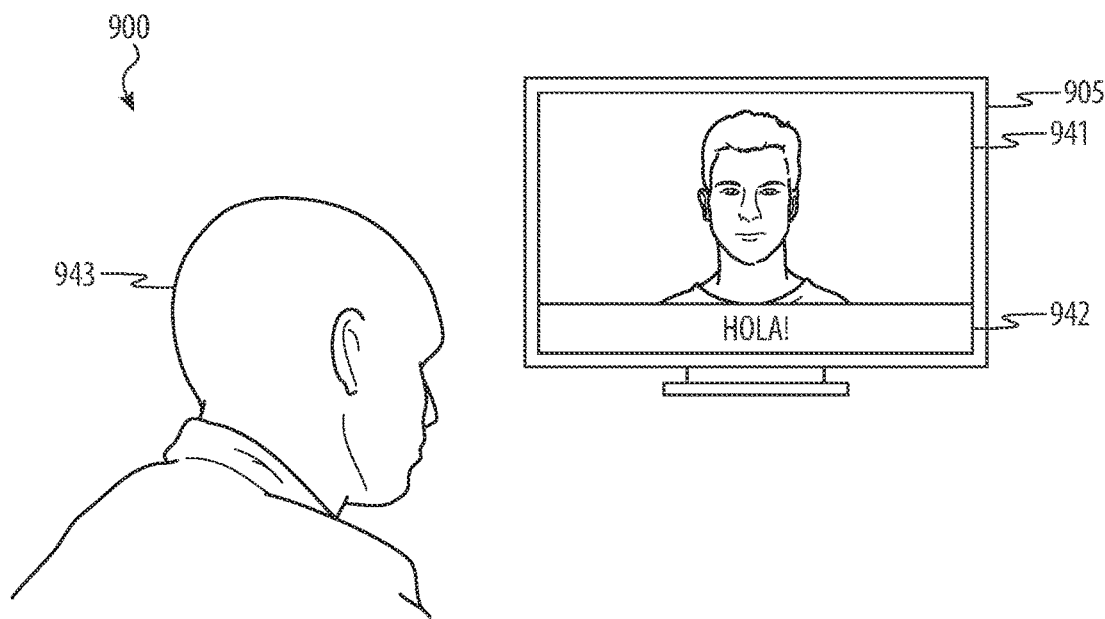
FIG. 9 depicts a first example of presenting video with translated audio data as text.

FIG. 9 depicts a first example 900 of presenting video 941 with translated audio data as text 942. As shown, a person 943 may view video 941 presented via a presentation device 905. The presentation device 905 may also present the translated audio data as the text 942, which may be closed captioning data. The translated audio data may be generated by the content access device 101 of FIG. 1 and/or using one or more of the methods 200, 600-800, and/or 1100-1200 of FIGS. 2, 6-8, and/or 11-12.

Figure 10:
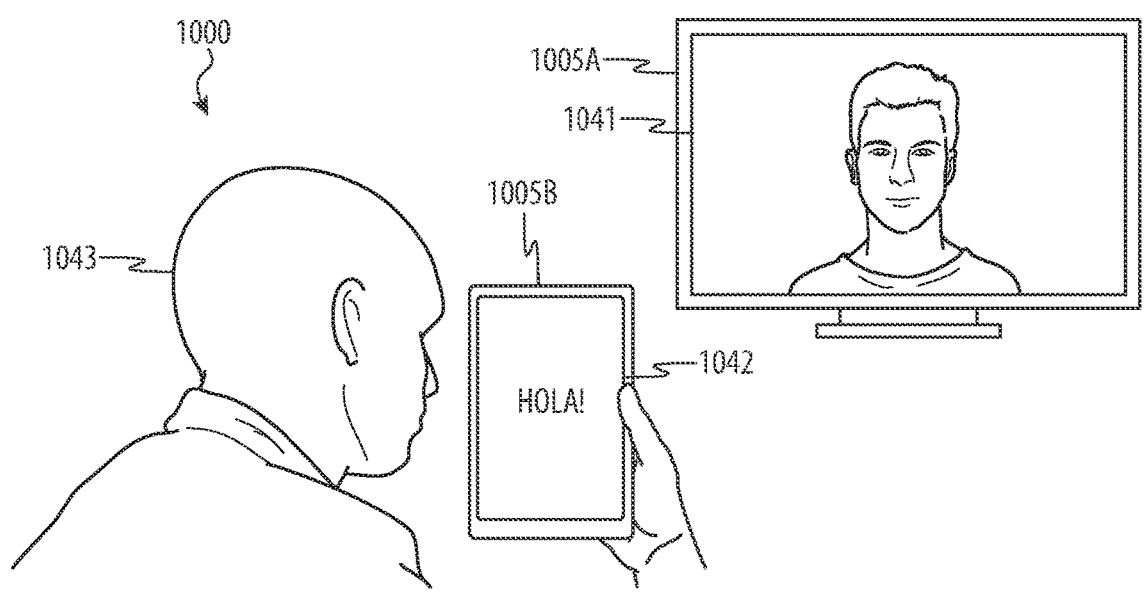
FIG. 10 depicts a second example of presenting video with translated audio data as text.

FIG. 10 depicts a second example 1000 of presenting video 1041 with translated audio data as text 1042. As shown, a person 1043 may view video 1041 presented via a first presentation device 1005A. As also shown, an associated presentation device 1005B, such as a mobile computing device associated with the person 1043, may present the translated audio data as the text 1042, which may be closed captioning data. The translated audio data may be generated by the content access device 101 of FIG. 1 and/or using one or more of the methods 200, 600-800, and/or 1100-1200 of FIGS. 2, 6-8, and/or 11-12.

Figure 11:
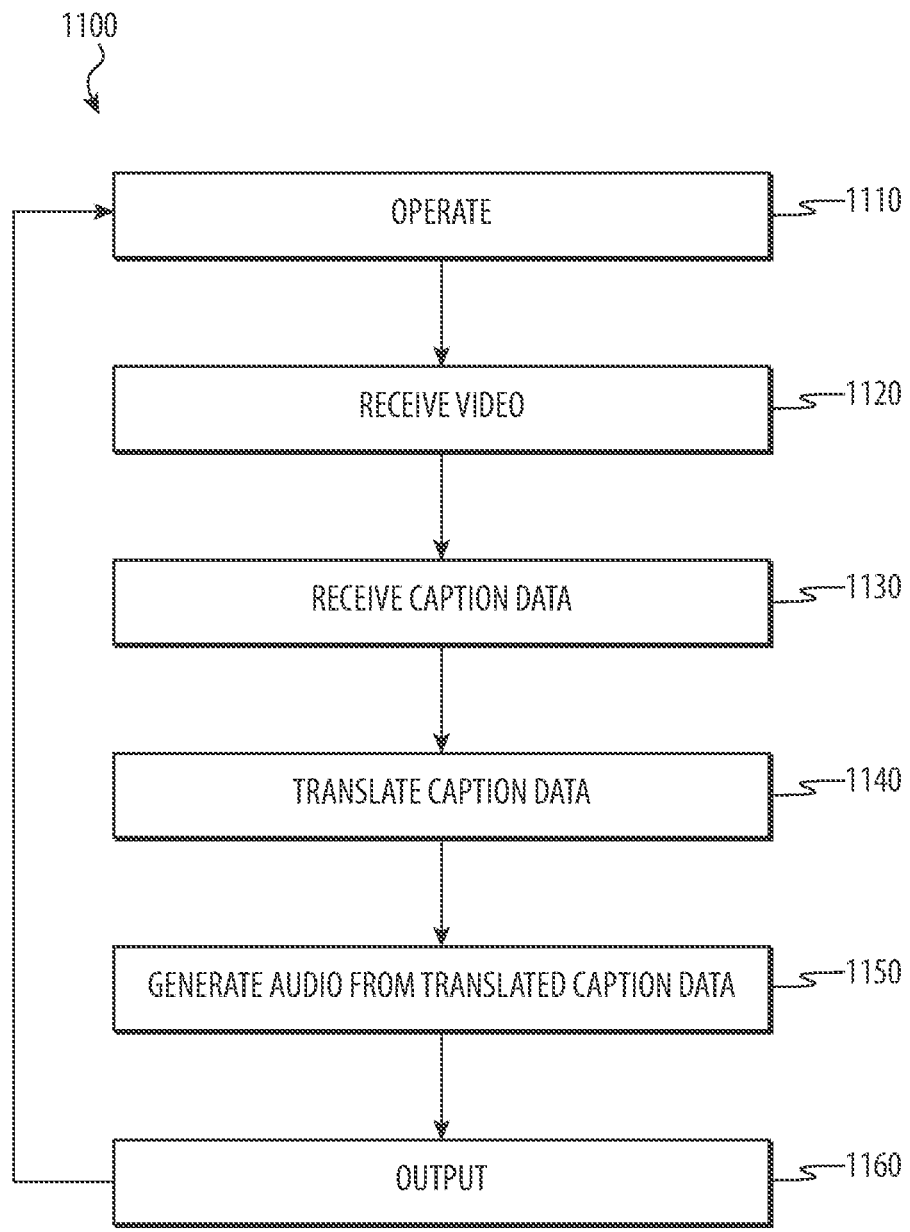
FIG. 11 depicts a flow chart illustrating a fifth example method for local audio translation for content presentation. This method may be performed by the system of FIG. 1.

FIG. 11 depicts a flow chart illustrating a fifth example method 1100 for local audio translation for content presentation. This method 1100 may be performed by the system 100 of FIG. 1.

At operation 1110, an electronic device (such as the content access device 101) may operate. The flow may proceed to operation 1120 where the electronic device may receive video. Next, the flow may proceed to operation 1130 where the electronic device may receive caption data associated with the video. The caption data may be of a first language.

At operation 1140, the electronic device may translate the caption data to a second language. At operation 1150, the electronic device may generate audio from the translated caption data.

The flow may then proceed to operation 1160 where the electronic device may output the video with the generated audio. Subsequently, the flow may then return to operation 1110 where the electronic device may continue to operate.

In various examples, this example method 1100 may be implemented as a group of interrelated software modules or components that perform various functions discussed herein. These software modules or components may be executed within a cloud network and/or by one or more computing devices, such as the content access device 101 of FIG. 1.

Although the example method 1100 is illustrated and described as including particular operations performed in a particular order, it is understood that this is an example. In various implementations, various orders of the same, similar, and/or different operations may be performed without departing from the scope of the present disclosure.

For example, the method 1100 is illustrated and described as the electronic device translating the caption data and generating the audio. However, it is understood that this is an example. In some implementations, the electronic device may perform these functions by requesting one or more related services from one or more service servers, such as the service server 104 of FIG. 1. Various configurations are possible and contemplated without departing from the scope of the present disclosure.

Figure 12:
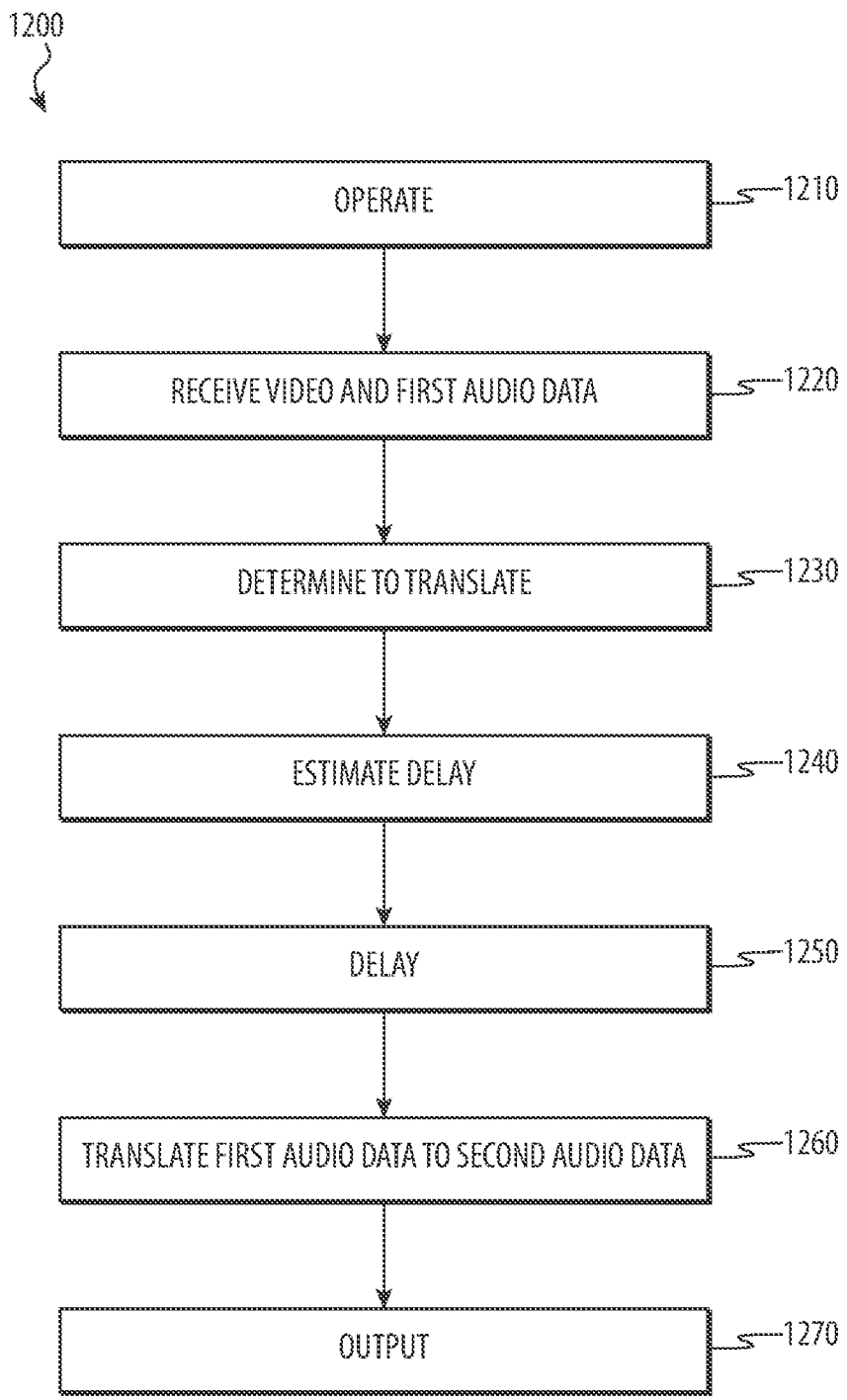
FIG. 12 depicts a flow chart illustrating a sixth example method for local audio translation for content presentation. This method may be performed by the system of FIG. 1.

FIG. 12 depicts a flow chart illustrating a sixth example method 1200 for local audio translation for content presentation. This method 1200 may be performed by the system 100 of FIG. 1.

At operation 1210, an electronic device (such as the content access device 101) may operate. The flow may proceed to operation 1220 where the electronic device may receive video and associated first audio data of a first language. Next, the flow may proceed to operation 1230 where the electronic device may determine to translate the first audio data.

The flow may then proceed to operation 1240 where the electronic device may estimate a delay for translation. The delay may involve a time period that the electronic device estimates will be used to accomplish the translation. The flow may then proceed to operation 1250 where the electronic device may delay output of the video for the estimated time period.

At operation 1260, the electronic device may translate the first audio data to second audio data of a second language. The flow may then proceed to operation 1270 where the electronic device may output the video with the second audio.

In various examples, this example method 1200 may be implemented as a group of interrelated software modules or components that perform various functions discussed herein. These software modules or components may be executed within a cloud network and/or by one or more computing devices, such as the content access device 101 of FIG. 1.

Although the example method 1200 is illustrated and described as including particular operations performed in a particular order, it is understood that this is an example. In various implementations, various orders of the same, similar, and/or different operations may be performed without departing from the scope of the present disclosure.

For example, the method 1200 is illustrated and described as determining to translate the first audio data. However, it is understood that this is an example. In some implementations, the electronic device may determine that the first language is the language configured for output and may omit operations 1240 through 1260, instead outputting the video with the first audio data at operation 1270. Various configurations are possible and contemplated without departing from the scope of the present disclosure.

By way of another example, the method 1200 is illustrated and described as determining to translate the first audio data. However, it is understood that this is an example. In some implementations, the electronic device may determine which language out of a possible set of languages to use for translation. The electronic device may determine the language to use for translation out of the possible set of languages based on user preferences, positional awareness, and so on. Various configurations are possible and contemplated without departing from the scope of the present disclosure.

In various implementations, a content access device may include a communication unit, a non-transitory storage medium that stores instructions, and a processor. The processor may execute the instructions to receive video using the communication unit; buffer the video in the non-transitory storage medium; receive, using the communication unit, first audio of a first language corresponding to the video; convert the first audio to first text in the first language; translate the first text to second text in a second language; generate second audio from the second text; synchronize the second audio with the video; and output the second audio with the video from the buffer.

In some examples, the processor may synchronize the second audio with the video using time stamps associated with the video and the first audio. In a number of examples, the processor may synchronize the second audio with the video by using motion analysis of the video to determine a speaker. In various examples, the processor may synchronize the second audio with the video by using speech analysis of the first audio to distinguish between speakers. In some examples, generation of the second audio may replicate an audio voice fingerprint from the first audio. In various examples, the processor may translate the first text by transmitting the first text to a translation server using the communication unit. In a number of examples, the processor may translate the first text using translation software.

In some implementations, a content access device may include a communication unit, a non-transitory storage medium that stores instructions, and a processor. The processor may execute the instructions to receive video using the communication unit; receive, using the communication unit, first audio data of a first language corresponding to the video; use translation software to translate the first audio data to second audio data of a second language; synchronize the second audio data with the video prior to outputting the video; and output the second audio data with the video.

In various examples, the processor may receive the first audio data prior to the video. In some examples, the first audio data may be closed captioning data.

In some examples, the processor may output the second audio data as text on a display. In a number of such examples, the content access device may include the display. In various such examples, the display may be incorporated into an electronic device and the processor may output the text on the display by transmitting the text to the electronic device.

In various examples, the processor may receive the first audio data and the video from separate sources.

In a number of implementations, a content access device may include a communication unit, a non-transitory storage medium that stores instructions, and a processor. The processor may execute the instructions to receive video using the communication unit; receive, using the communication unit, first audio data of a first language corresponding to the video; translate the first audio data to second audio data of a second language; estimate a time to delay presentation of the video to account for a translation time of the first audio data; delay presentation of the video for the time; and output the video with the second audio data.

In some examples, the processor may select the second language based on received user input. In a number of such examples, the received user input may be stored.

In various examples, the processor may select the second language based on a location of the content access device. In some examples, the processor may receive the video and the first audio data in a single stream. In a number of examples, the processor may receive the video and the first audio data as separate streams.

As described above and illustrated in the accompanying figures, the present disclosure relates to content access devices that use local audio translation for content presentation. A content access device may receive video and first audio data associated with a first language. The content access device may use translation software and/or other automated translation services to translate the first audio data to second audio data associated with a second language. The content access device may synchronize the video with the second audio data and output the video and the second audio data for presentation.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A content access device, comprising:
a communication unit;
a non-transitory storage medium that stores instructions; and
a processor that executes the instructions to:
receive video using the communication unit;
receive, using the communication unit, first audio of a first language corresponding to the video, the video and the first audio corresponding to at least one of a television program, a movie, or video on demand;
buffer the video while:
converting the first audio to first text in the first language;
translating the first text to second text in a second language;
generating second audio from the second text; and
synchronizing the second audio with the video; and
output the second audio with the video from the buffer.

2. The content access device of claim 1, wherein the processor synchronizes the second audio with the video using time stamps associated with the video and the first audio.

3. The content access device of claim 1, wherein the processor synchronizes the second audio with the video by using motion analysis of the video to determine a speaker.

4. The content access device of claim 1, wherein the processor synchronizes the second audio with the video by using speech analysis of the first audio to distinguish between speakers.

5. The content access device of claim 1, wherein generation of the second audio replicates an audio voice fingerprint from the first audio.

6. The content access device of claim 1, wherein the processor translates the first text by transmitting the first text to a translation server using the communication unit.

7. The content access device of claim 1, wherein the processor translates the first text using translation software.

8. A content access device, comprising:
a communication unit;
a non-transitory storage medium that stores instructions; and
a processor that executes the instructions to:
receive video using the communication unit;
receive, using the communication unit, first audio data of a first language corresponding to the video, the video and the first audio data corresponding to at least one of a television program, a movie, or video on demand;
buffer the video while:
using translation software to translate the first audio data to second audio data of a second language; and
synchronizing the second audio data with the video prior to outputting the video; and
output the second audio data with the video from the buffer.

9. The content access device of claim 8, wherein the processor receives the first audio data prior to the video.

10. The content access device of claim 8, wherein the first audio data is closed captioning data.

11. The content access device of claim 8, wherein the processor outputs the second audio data as text on a display.

12. The content access device of claim 11, wherein the content access device includes the display.

13. The content access device of claim 11, wherein:
the display is incorporated into an electronic device; and
the processor outputs the text on the display by transmitting the text to the electronic device.

14. The content access device of claim 8, wherein the processor receives the first audio data and the video from separate sources.

15. A method comprising:
receiving video using at least one processor;
receiving, using the at least one processor, first audio of a first language corresponding to the video, the video and the first audio corresponding to at least one of a television program, a movie, or video on demand;
buffering the video using the at least one processor while:
converting the first audio to first text in the first language using the at least one processor;
translating the first text to a second language using the at least one processor; and
synchronizing, using the at least one processor, second audio corresponding to translation of the first text to the second audio with the video; and
outputting, using the at least one processor, the second audio with the video from the buffer.

16. The method of claim 15, further comprising using translation software to translate the first audio to second audio data of the second language.

17. The method of claim 15, wherein translating the first text to the second language comprises translating the first text to second text.

18. The method of claim 17, further comprising generating the second audio from the second text.

19. The method of claim 15, further comprising receiving the first audio prior to receiving the video.

20. The method of claim 15, further comprising selecting the second language based on a location.

* * * * *